(12) United States Patent
Lewis

(10) Patent No.: US 9,030,046 B2
(45) Date of Patent: May 12, 2015

(54) CIRCUITS FOR DC ENERGY STORES

(75) Inventor: Eric Anthony Lewis, Warwickshire (GB)

(73) Assignee: GE Energy Power Conversion Technology Ltd, Warwickshire (GB)

( * ) Notice: Subject to any disclaimer, the term of this patent is extended or adjusted under 35 U.S.C. 154(b) by 675 days.

(21) Appl. No.: 13/421,200

(22) Filed: Mar. 15, 2012

(65) Prior Publication Data

US 2013/0093241 A1 Apr. 18, 2013

(30) Foreign Application Priority Data

Mar. 28, 2011 (EP) ..................................... 11002528

(51) Int. Cl.
| | |
|---|---|
| H02J 7/00 | (2006.01) |
| H02J 9/00 | (2006.01) |
| H02J 5/00 | (2006.01) |
| H02M 7/797 | (2006.01) |
| H02M 1/00 | (2006.01) |

(52) U.S. Cl.
CPC .................. *H02J 5/00* (2013.01); *H02M 7/797* (2013.01); *H02M 2001/007* (2013.01)

(58) Field of Classification Search
CPC .............. H02J 9/00; H02J 9/04; H02J 7/345; H02J 3/32; Y02E 10/563
USPC ................................................ 307/64, 66, 82
See application file for complete search history.

(56) References Cited

U.S. PATENT DOCUMENTS

2006/0017328 A1* 1/2006 Bryde ............................. 307/64
2011/0280055 A1* 11/2011 Nielsen .......................... 363/131

FOREIGN PATENT DOCUMENTS

| DE | 212008000035 U1 | 2/2010 |
|---|---|---|
| WO | 2010138948 A2 | 12/2010 |

OTHER PUBLICATIONS

Dr. Felix Jenni, Dr. Dieter Wuest: Steuerverfahren fur selbstgefuhrte stromrichter, 1995, vdf Hochschulverlag AG an der ETH, Zurich, XP000002657543, ISBN: 3-7281-2141-X, pp. 72-73, Fig. 4.1.

\* cited by examiner

*Primary Examiner* — Carlos Amaya
(74) *Attorney, Agent, or Firm* — Parks Wood LLC

(57) ABSTRACT

A dc energy store includes auxiliary systems operable in different modes, including self-supporting, island mode and normal modes. In the self-supporting mode a first controller uses a voltage demand signal indicative of desired ac voltage of an AC/DC power converter to control semiconductor power switching devices to achieve the desired level of ac voltage. The voltage demand signal is derived from comparing a voltage feedback signal and a second voltage demand signal preset to provide the desired ac voltage for the auxiliary systems. A second controller uses a current demand signal indicative of the desired dc link current to control the semiconductor power switching devices of a DC/DC power converter to achieve the desired level of dc link current. The current demand signal is derived from comparing a dc link voltage demand signal indicative of a desired dc link voltage and a dc link voltage feedback signal.

22 Claims, 7 Drawing Sheets

CIRCUITS FOR DC ENERGY STORES

FIELD OF THE INVENTION

The present invention relates to circuits for dc energy stores, and in particular to circuits that allow the dc energy store to supply power to auxiliary systems of the dc energy store such as fans or pumps, for example.

BACKGROUND OF THE INVENTION

DC energy stores can be implemented from many different technologies such as batteries (e.g. lithium and sodium sulphur type), capacitors including supercapacitors and ultracapacitors, and flow cells (e.g. vanadium redox flow cells). Energy can be stored in the dc energy store and released when it is needed. This ability to store and release energy is useful in a number of different applications including storing excess wind energy and releasing that energy to an ac supply network or power grid at a later time when less wind energy is available. A different application is to store energy in case an electrical generator stops operating. The energy stored in the dc energy store can then be used to keep essential systems and services operating until a standby or back-up generator is started and brought into operation. In some circumstances it can also be helpful to store energy slowly and allow the energy stored in the dc energy store to be released very quickly for applications that need high power pulses of energy like the linear electrical motors that are used to start roller coasters.

The dc energy store will typically have auxiliary systems such as pumps, fans, control units and other devices that are connected to the ac supply network. If the ac supply network is interrupted or experiences voltage or frequency transients then the auxiliary systems will not receive power and this can cause problems with the practical operation of the dc energy store. For example, if the fans that are used to cool the dc energy store stop working then this can result in unacceptable temperature increases. Certain types of dc energy store also require pumps to continue running at their optimum efficiency.

SUMMARY OF THE INVENTION

The present invention provides a dc energy store circuit comprising: a dc energy store having auxiliary systems (e.g. pumps, fans, control units and other devices associated with the dc energy store and which are typically essential for its normal or standard operation as opposed to just being general consumer loads connected to an ac supply network or power grid); an AC/DC power converter including a plurality of semiconductor power switching devices, the AC/DC power converter having dc terminals and ac terminals that are electrically connected to an ac supply network or power grid, optionally by means of a filter and/or a transformer; a DC/DC power converter including a plurality of semiconductor power switching devices, the DC/DC power converter having first dc terminals electrically connected to the dc terminals of the AC/DC power converter by means of a dc link and second dc terminals electrically connected to dc terminals of the dc energy store, optionally by means of dc inductors and filter capacitors; a first controller for the AC/DC power converter; and a second controller for the DC/DC power converter.

The dc energy store circuit can operate in one or more of three modes, optionally switching between operating modes when circumstances demand. In a 'self-supporting mode' the dc energy store circuit is used to supply power from the dc energy store to the auxiliary systems of the dc energy store when power is not available from the ac supply network. In this mode the dc energy store circuit will typically be isolated from the ac supply network to ensure that a fault in the ac supply network will not prevent operation in the self-supporting mode. The dc energy store circuit can be isolated by any suitable means, e.g. switch. In an 'island mode' the dc energy store circuit is used to supply power from the dc energy store to the auxiliary systems and other electrical loads connected to the ac supply network when the dc energy store is the main source of power. In a 'normal mode' the ac supply network is operating normally and is connected to other generators. The dc energy store circuit is used to supply power from the ac supply network to the dc energy store and to supply power from the dc energy store to the ac supply network, i.e. to charge and discharge the dc energy store, respectively.

When the dc energy store circuit is operating in a self-supporting mode in which power is supplied from the dc energy store to the auxiliary systems of the dc energy store:

the first controller uses a voltage demand signal indicative of desired ac voltage at the ac terminals of the AC/DC power converter to control the semiconductor power switching devices of the AC/DC power converter to achieve the desired level of ac voltage that corresponds to the voltage demand signal, the voltage demand signal being derived from a comparison of a voltage feedback signal and a second voltage demand signal that is preset to provide the desired ac voltage for the auxiliary systems of the dc energy store; and the second controller uses a current demand signal indicative of desired dc link current to control the semiconductor power switching devices of the DC/DC power converter to achieve the desired level of dc link current that corresponds to the current demand signal, the current demand signal being derived from a comparison of a dc link voltage demand signal indicative of desired dc link voltage and a dc link voltage feedback signal.

The self-supporting operating mode is typically used when the ac supply network or power grid that would normally supply power to the auxiliary systems is not available for any reason (e.g. a fault). The stored power in the dc energy store can therefore be used to supply power to the auxiliary systems to keep them operating normally or to enable a shutdown procedure to take place.

In the self-supporting mode the first controller preferably includes a pulse width modulation (PWM) modulator that derives firing commands for the semiconductor power switching devices of the AC/DC power converter on the basis of the voltage demand signal and the required frequency of the ac supply network.

When the dc energy store circuit is operating in an island mode in which power is supplied from the dc energy store to the ac supply network and the auxiliary systems of the dc energy store:

the first controller uses a voltage demand signal indicative of desired ac voltage at the ac terminals of the AC/DC power converter to control the semiconductor power switching devices of the AC/DC power converter to achieve the desired level of ac voltage that corresponds to the voltage demand signal, the voltage demand signal being derived from a comparison of a voltage feedback signal and a second voltage demand signal that is preset to provide the desired ac voltage for the ac supply network, and the second controller uses a current demand signal indicative of desired dc link current to control the semiconductor power switching devices of the DC/DC power converter to achieve the desired level of dc link current that corresponds to the current demand signal, the current demand signal being derived from a comparison of a dc link voltage demand signal indicative of desired dc link voltage and a dc link voltage feedback signal.

The island operating mode is typically used when the dc energy store is the main provider of power to external loads connected to the ac supply network or power grid.

In the island operating mode the first controller preferably includes a PWM modulator that derives firing commands for the semiconductor power switching devices of the AC/DC power converter on the basis of the voltage demand signal and a frequency demand signal, the frequency demand signal being derived from a comparison of a frequency feedback signal and a frequency demand signal that is preset to provide the desired ac frequency for the ac supply network.

In the self-supporting and island operating modes the second controller preferably includes a PWM modulator that derives firing commands for the semiconductor power switching devices of the DC/DC power converter on the basis of a voltage demand signal and a phase angle input, the voltage demand signal being derived from a comparison of a current feedback signal and one of the current demand signal and a limited version of the current demand signal obtained from a current limiter.

In the self-supporting and island operating modes the second controller can include a current limiter that derives a limited version of the current demand signal using a current limit signal indicative of maximum permitted current at the dc terminals of the dc energy store. The current limit signal can be provided by the dc energy store or its associated controller, for example. The current limiter can provide a control signal if the current demand signal is greater than the current limit signal. In the self-supporting and island operating modes the control signal is typically used to cause the dc energy store circuit to trip or shut down. An additional trip signal can be provided if the ac current at the ac terminals of the AC/DC power converter is greater than a maximum permitted current.

The dc energy store circuit can also be operated in a normal mode in which power is supplied from the ac supply network to the dc energy store to charge the dc energy store or power is supplied from the dc energy store to the ac supply network to discharge the dc energy store. In the normal operating mode, the power for the auxiliary systems of the dc energy store can come either from the ac supply network or the dc energy store depending on the value of a power demand signal indicative of desired ac power at the ac terminals of the AC/DC power converter. The auxiliary systems are preferably electrically connected to the ac supply network on either side of the optional transformer. More particularly, the auxiliary systems can have respective ac terminals that are connected directly to the ac supply network, e.g. in parallel with the rest of the dc energy store circuit, or indirectly by means of the optional transformer or any other interposing electrical component. When the dc energy store circuit is operating in the normal mode:

the first controller uses real and reactive current demand signals indicative of desired real and reactive current at the ac terminals of the AC/DC power converter to control the semiconductor power switching devices of the AC/DC power converter to achieve the desired level of real and reactive current that corresponds to the real and reactive current demand signals, the real current demand signal being derived from a comparison of a dc link voltage demand signal indicative of desired dc link voltage and a dc link voltage feedback signal (thereby ensuring that the dc link voltage preferably remains substantially constant during the normal operating mode); and the second controller uses a current demand signal indicative of desired dc current at the dc terminals of the dc energy store to control the semiconductor power switching devices of the DC/DC power converter to achieve the desired level of dc current that corresponds to the current demand signal, the current demand signal being derived by a power calculation unit on the basis of (i) the power demand signal indicative of desired ac power at the ac terminals of the AC/DC power converter (i.e. the power demand signal mentioned above), (ii) a voltage feedback signal indicative of dc voltage at the dc terminals of the dc energy store, and (iii) any losses in the dc energy store circuit (e.g. in the ac circuit which connects the AC/DC power converter to the ac supply network, in the dc circuit which connects the dc terminals of the DC/DC power converter 14, and the auxiliary systems of the dc energy circuit).

In the normal operating mode the first controller can include a PWM modulator that derives firing commands for the semiconductor power switching devices of the AC/DC power converter using relatively conventional methods on the basis of D- and Q-axis voltage demand signals and an ac supply network phase angle input, typically derived from a phase-locked loop (PLL) unit. The reactive current demand signal may be derived from one or more current demand signals that define a desired level of ac supply reactive current, cancel the reactive current of the filter, and correct the phase shift in the ac supply network or power grid to deliver the correct power at a defined point in the ac supply network, for example. The reactive current demand signal is therefore typically indicative of the ac reactive power current required in the ac circuit. The Q-axis voltage demand signal can be derived from a comparison of the real current demand signal and a current feedback signal indicative of real ac current at the ac terminals of the AC/DC power converter. Similarly, the D-axis voltage demand signal can be derived from a comparison of the reactive current demand signal and a current feedback signal indicative of reactive ac current at the ac terminals of the AC/DC power converter.

In the normal operating mode the current demand signal of the second controller can be further derived by the power calculation unit on the basis of a dc link feedback signal indicative of dc link voltage, and the real current demand signal of the first controller can be further derived from a current signal that is provided by the power calculation unit of the second controller.

In the normal operating mode the second controller preferably includes a PWM modulator that derives firing commands for the semiconductor power switching devices of the DC/DC power converter on the basis of a voltage demand signal and a phase angle input, the voltage demand signal being derived from a comparison of a current feedback signal and one of the current demand signal and a limited version of the current demand signal obtained from a current limiter.

In the normal operating mode the second controller preferably includes a current limiter that derives a limited version of the current demand signal using a current limit signal indicative of maximum permitted current at the dc terminals of the dc energy store. The current limiter can provide a control signal to the power calculation unit if the current demand signal is greater than the current limit signal. If the power calculation unit receives a control signal then it may issue a warning to the user of the system that it is continuing to operate but is unable to supply or absorb the requested power.

In the normal operating mode the current demand signal can be further derived by the power calculation unit on the basis of a power feedback signal indicative of ac power in the ac supply network. The power feedback signal is used by the power calculation unit to apply a slow acting correction of the losses in the dc energy store circuit.

The AC/DC and DC/DC power converters may have any suitable topology and use any suitable semiconductor power switching devices. The operation of the semiconductor power switching devices in the AC/DC and DC/DC power converters can be controlled using gate drive control signals derived in accordance with a conventional PWM strategy. It will be readily appreciated that various types of PWM strategy can be considered.

The dc energy store may also be implemented from any suitable technology such as battery, capacitor and flow cell technology.

The dc energy store circuits described above propose two independent controllers but it would be possible to integrate the functionality of the controllers on to one physical controller. Similarly, the functionality of each controller for the AC/DC and DC/DC power converters could be spread across more than one controller (e.g. a different physical controller for each operating mode of the dc energy store) if this is convenient to the practical implementation of the dc energy store circuit.

The ac supply network can have a single or multi-phase (e.g. three-phase) construction.

The present invention further provides a method of operating a dc energy store circuit comprising: a dc energy store having auxiliary systems; an AC/DC power converter including a plurality of semiconductor power switching devices, the AC/DC power converter having dc terminals and ac terminals that are electrically connected to an ac supply network, optionally by means of a filter and/or a transformer; a DC/DC power converter including a plurality of semiconductor power switching devices, the DC/DC power converter having first dc terminals electrically connected to the dc terminals of the AC/DC power converter by means of a dc link and second dc terminals electrically connected to dc terminals of the dc energy store, optionally by means of dc inductors and filter capacitors; a first controller for the AC/DC power converter; and a second controller for the DC/DC power converter; wherein the method comprises the step of operating the dc energy store in a self-supporting mode in which power is supplied from the dc energy store to the auxiliary systems of the dc energy store such that:

the first controller uses a voltage demand signal indicative of desired ac voltage at the ac terminals of the AC/DC power converter to control the semiconductor power switching devices of the AC/DC power converter to achieve the desired level of ac voltage that corresponds to the voltage demand signal, the voltage demand signal being derived from a comparison of a voltage feedback signal and a second voltage demand signal that is preset to provide the desired ac voltage for the auxiliary systems of the dc energy store; and the second controller uses a current demand signal indicative of the desired dc link current to control the semiconductor power switching devices of the DC/DC power converter to achieve the desired level of dc link current that corresponds to the current demand signal, the current demand signal being derived from a comparison of a dc link voltage demand signal indicative of a desired dc link voltage and a dc link voltage feedback signal.

The method can further or alternatively comprise the step of operating the dc energy store circuit in an island mode in which power is supplied from the dc energy store to the ac supply network and the auxiliary systems of the dc energy store such that:

the first controller uses a voltage demand signal indicative of desired ac voltage at the ac terminals of the AC/DC power converter to control the semiconductor power switching devices of the AC/DC power converter to achieve the desired level of ac voltage that corresponds to the voltage demand signal, the voltage demand signal being derived from a comparison of a voltage feedback signal and a second voltage demand signal that is preset to provide the desired ac voltage for the ac supply network, and the second controller uses a current demand signal indicative of the desired dc link current to control the semiconductor power switching devices of the DC/DC power converter to achieve the desired level of dc link current that corresponds to the current demand signal, the current demand signal being derived from a comparison of a dc link voltage demand signal indicative of a desired dc link voltage and a dc link voltage feedback signal.

The method can further or alternatively comprise the step of operating the dc energy store in a normal mode in which power is supplied from the ac supply network to the dc energy store to charge the dc energy store or power is supplied from the dc energy store to the ac supply network to discharge the dc energy store such that:

the first controller uses real and reactive current demand signals indicative of the desired real and reactive current at the ac terminals of the AC/DC power converter to control the semiconductor power switching devices of the AC/DC power converter to achieve the desired level of real and reactive current that corresponds to the real and reactive current demand signals, the real current demand signal being derived from a comparison of a dc link voltage demand signal indicative of a desired dc link voltage and a dc link voltage feedback signal (thereby ensuring that the dc link voltage preferably remains substantially constant during the normal operating mode); and the second controller uses a current demand signal indicative of the desired dc current at the dc terminals of the dc energy store to control the semiconductor power switching devices of the DC/DC power converter to achieve the desired level of dc current that corresponds to the current demand signal, the current demand signal being derived by a power calculation unit on the basis of (i) a power demand signal indicative of the desired ac power at the ac terminals of the AC/DC power converter, (ii) a voltage feedback signal indicative of the dc voltage at the dc terminals of the dc energy store, and (iii) any losses in the dc energy store circuit.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

1. Dc Energy Store Circuit Topology

Figure 1:
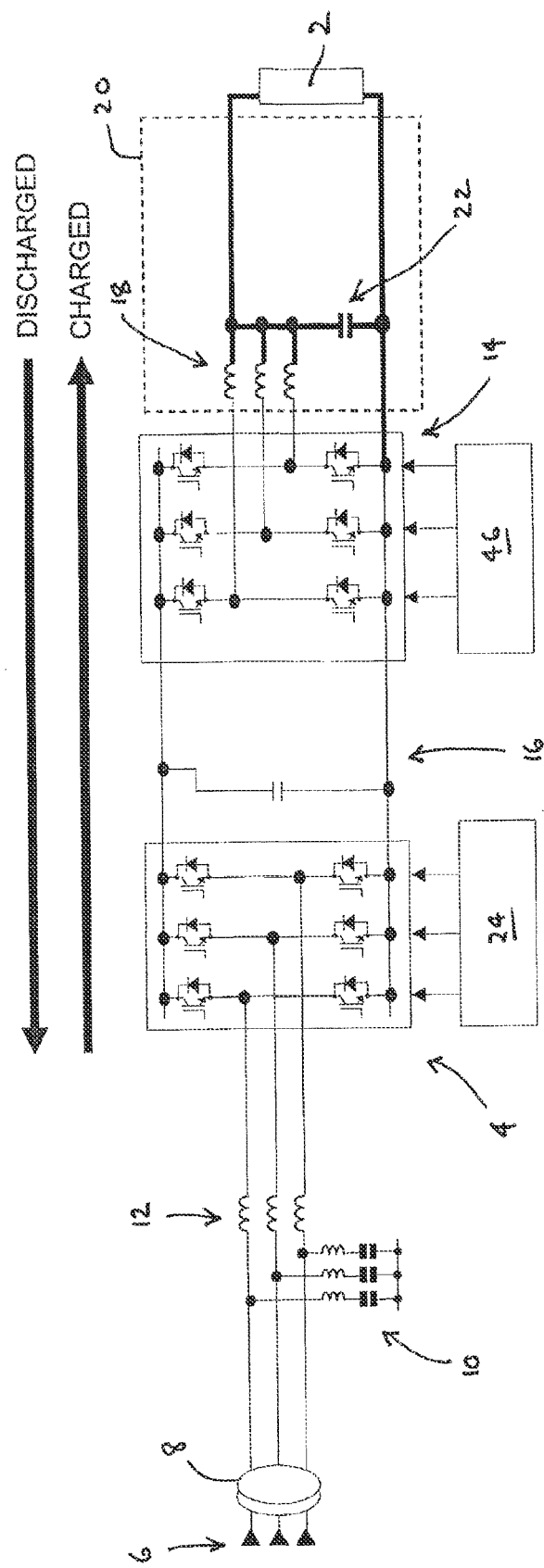
FIG. 1 is a schematic drawing showing a dc energy store circuit according to the present invention.

With reference to FIG. 1, the circuit for a dc energy store 2 includes an AC/DC power converter 4. The AC/DC power converter 4 can be an inverter having a conventional three-phase two-level topology with a series of semiconductor power switching devices (e.g. IGBTs, IEGTs or IGCTs) fully controlled and regulated using a pulse width modulation (PWM) strategy. However, in practice the AC/DC power converter 4 can have any suitable topology such a three-level neutral point clamped topology or a multi-level topology, for example.

The ac terminals of the AC/DC power converter 4 are connected to a three-phase ac supply 6 by means of a transformer 8, a passive harmonic filter circuit 10 and a conventional reactor 12 that limits PWM harmonic currents. The filter circuit 10 is shown in its simplest form, however in practice a number of different filter circuits can be combined to achieve the required harmonic voltages in the ac supply 6 and this may include an extra reactor in the ac connection between the transformer 8 and the filter circuit 10.

A DC/DC power converter 14 is connected to the dc terminals of the AC/DC power converter 4 by means of a dc link 16. The DC/DC power converter 14 can have a similar three-phase two-level topology to the AC/DC power converter 4 with a series of semiconductor power switching devices (e.g. IGBTs, IEGTs or IGCTs) fully controlled and regulated using a PWM strategy. However, in practice the DC/DC power converter 14 can have any suitable topology, as discussed above for the AC/DC power converter. The derivation of the gate drive command signals that are used to control the semiconductor power switching devices of the AC/DC and DC/DC power converters is described in more detail below.

The DC/DC power converter 14 provides three dc currents that are controlled to either store energy in, or extract energy from, the dc energy store 2. The dc energy store 2 is connected to the DC/DC power converter 14 by dc reactors 18 that limit the PWM harmonic currents into an optional smoothing capacitor 22 and the dc energy store.

The dc energy store 2 can be of any suitable type (e.g. lithium batteries, super-capacitors, flywheels and flow cells). The dc terminals of the DC/DC power converter 14 at the AC/DC power converter side may be regulated to be at substantially constant dc voltage while the dc voltage of the dc energy store 2 may be subject to a significant variation in dc terminal voltage during different operation modes as a result of the changing voltage of the dc energy store as dc power is either stored or extracted.

It will be readily appreciated that the AC/DC power converter 4 may operate as an active rectifier or an inverter depending on whether power is being supplied to the dc energy store 2 from the ac supply 6 or vice versa. For example, when power is being supplied to the dc energy store 2 from the ac supply 6 (i.e. the dc energy store is being charged) then the AC/DC power converter 4 acts as an active rectifier and converts the ac power to dc power that is then made compatible with the dc terminal voltage of the dc energy store by means of the interposing DC/DC power converter 14. When power is being supplied to the ac supply 6 from the dc energy store 2 (i.e. the dc energy store is being discharged) then the AC/DC power converter 4 acts as an inverter to convert the dc power to ac power that is compatible with the ac power supply. The AC/DC and DC/DC power converters 4, 16 are therefore capable of bidirectional power flow.

The semiconductor power switching devices of the AC/DC power converter are controlled by a controller 24 and the semiconductor power switching devices of the DC/DC power converter are controlled by a controller 46. The controllers are described in more detail below with regard to different operating modes of the dc energy store 2.

It will be readily appreciated from the above description that the overall dc energy store circuit may be divided into five sub-circuits, namely:
(i) an ac circuit which connects the AC/DC power converter 4 to the ac supply 6;
(ii) the AC/DC power converter 4;
(iii) a dc link circuit 16 which connects the dc terminals of the AC/DC power converter 4 to the DC/DC power converter 14;
(iv) the DC/DC power converter 14; and
(v) a dc circuit 20 which connects the dc terminals of the DC/DC power converter 14 to the dc energy store 2.

2. Normal Operating Mode Shown in FIGS. 2 and 3

2.1 AC/DC Power Converter Control

The controller 24 for the AC/DC power converter 4 includes a phase locked loop (PLL) unit 26 that provides an output signal that is indicative of the magnitude and the phase angle of the ac supply 6. An ac to dc control unit 28 uses the output signal of the PLL unit 26 to convert measured ac current signals from ac current sensors 30 in the ac circuit to dc current feedback signals Iqfb and Idfb that are indicative of the actual ac power current and the actual reactive current flowing in the ac circuit.

The required ac power current for the ac circuit is defined by current signals IQ1 and IQ2. Current signal IQ2 is normally supplied by the power calculation unit 48 (see below) to provide a feedforward signal of a significant change in the demanded power to help the stability of the dc energy store circuit that is explained in more detail below.

A voltage feedback signal VDCbus is provided by a dc voltage sensor 32 in the dc link circuit and is indicative of the dc link voltage. The voltage feedback signal VDCbus is compared against a voltage demand signal VDCr that is indicative of the required dc link voltage that is within the rating limits of the AC/DC and DC/DC power converters 4, 14 (e.g. 1 kV dc). It will be readily appreciated that the various arrangements shown in the drawings use a number of amplifiers that compare an actual signal with the required value for the signal and the resulting difference between the two signals is then amplified and used to reduce any error between them. Such an amplifier typically has a circuit with a proportional (P) gain for a fast response and an integral (I) gain for a more accurate longer time response and is often referred to as a P+I amplifier. The comparison between the voltage feedback signal VDCbus and the voltage demand signal VDCr is made in a P+I volts amplifier 34 which provides the current signal IQ1 for the controller 24 of the AC/DC power converter 4. This ensures that the dc link voltage is controlled during operation of the dc energy store 2 to the required level of accuracy.

The current signals IQ1 and IQ2 are added together in an IQ adder 36 to give a net current demand signal Iqr that is indicative of the net ac power current required in the ac circuit.

The current demand signal Iqr is compared against the dc current feedback signal Iqfb in a quadrature (Q) axis error amplifier 38 with P+I circuits to give a quadrature axis voltage demand signal Vqr for the AC/DC power converter 4. The quadrature axis voltage demand signal Vqr is a dc signal that is turned into the correct firing commands for the semiconductor power switching devices of the AC/DC power converter 4 using the output signal from the PLL unit 26 that represents the phase angle of the ac supply 6. The result is to achieve a flow of ac power current that is defined by the current demand signal Iqr.

The required ac supply reactive currents for the ac circuit are defined by the current demand signals IVARr, ICAPr and IPAr. The current demand signal IVARr is normally supplied by the user of the dc energy store 2 to request that the dc energy store circuit supplies a defined value of ac supply reactive current. The normal reason for doing this is to control the ac supply voltage at a defined point in the ac supply 6. The current demand signal ICAPr is normally preset to cancel the reactive current of the harmonic filter circuit 10. The current demand signal IPAr is normally supplied by the IQ adder 36 to correct the phase shift in the ac supply 6 to deliver the correct power at a defined point in the ac supply. The current demand signals IVARr, ICAPr and IPAr are added together in an ID adder 40 to give a net reactive current demand signal Idr that is indicative of the ac reactive power current required in the ac circuit.

The current demand signal Idr is compared against the dc current feedback signal Idfb in a direct (D) axis error amplifier 42 with P+I circuits to give a direct axis voltage demand signal Vdr for the AC/DC power converter 4. The direct axis voltage demand signal Vdr is a dc signal that is turned into the correct firing commands for the semiconductor power switching devices of the AC/DC power converter 4 using the output signal from the PLL unit 26 that represents the phase angle of the ac supply 6. The result is to achieve a flow of ac supply reactive current as defined by the current demand signal Idr.

The quadrature and direct axis voltage demand signals Vqr and Vdr are turned into firing commands in a PWM modulator 44.

It will be readily appreciated that the AC/DC power converter control is functionally relatively similar to power converter drives that are used to interface ac electrical machines (e.g. motors) to an ac supply.

Figure 2:
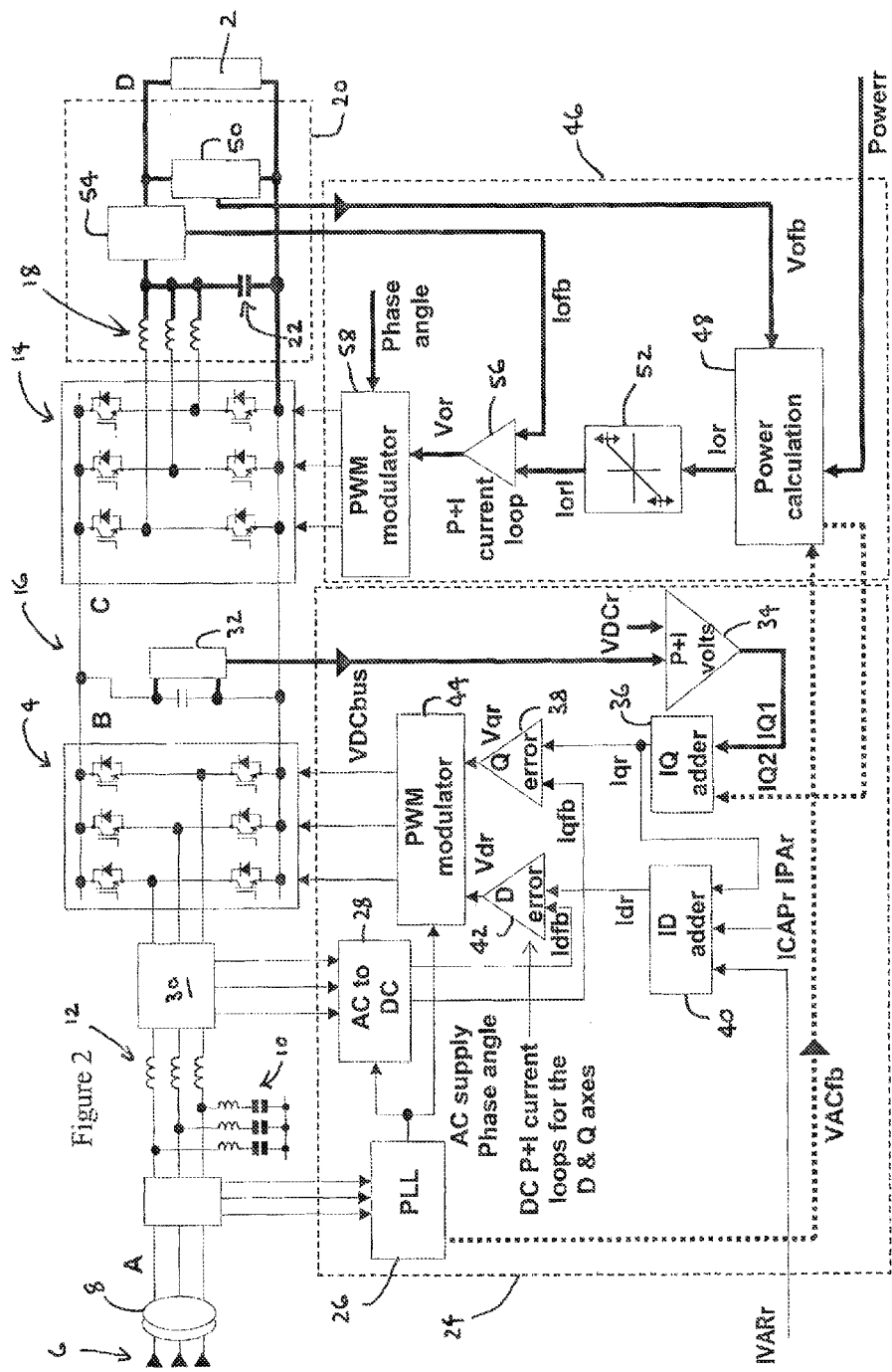
FIG. 2 is a schematic drawing showing the controller arrangement when the dc energy store is operating in a normal mode.
Figure 3:
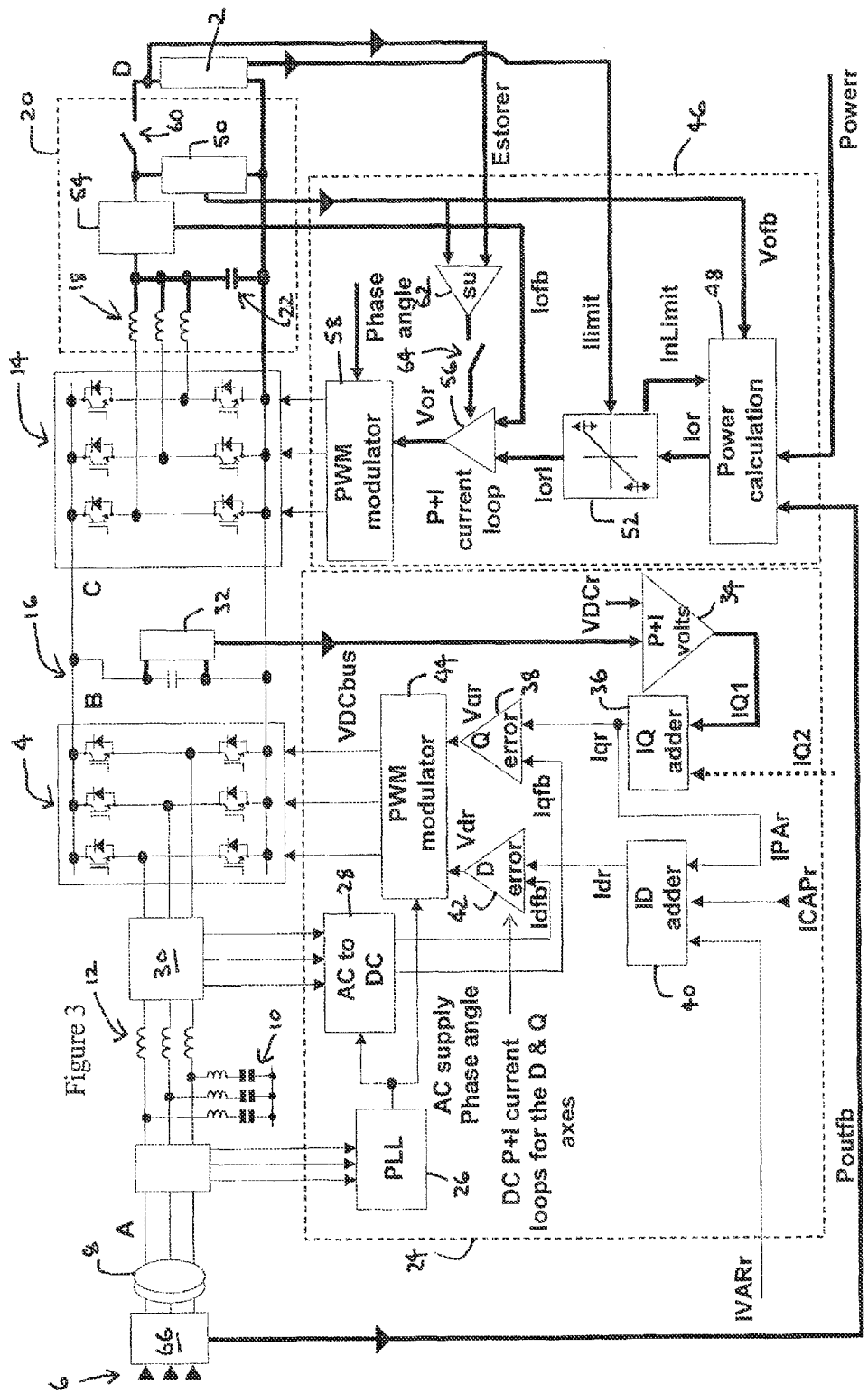
FIG. 3 is a schematic drawing showing an alternative controller arrangement when the dc energy store is operating in a normal mode.

Although not shown in FIGS. 2 and 3, the dc energy store 2 includes auxiliary systems 68 (FIGS. 4 and 5) that are essential to its normal operation. For example, the auxiliary systems can include pumps for circulating electrolytes through the cell of a vanadium redox battery, cooling fans, control units for controlling the dc energy store etc. The auxiliary systems 68 are connected to the ac supply 6 and can be supplied from either side of the transformer 8. During normal operation, the auxiliary systems 68 will take energy directly from the ac supply 6.

2.2 DC/DC Power Converter Control

The controller 46 for the DC/DC power converter 14 includes a power calculation circuit 48 that provides a current demand signal Ior indicative of the required dc current in the dc circuit. The current demand signal Ior is derived using a power demand signal Powerr indicative of the ac power required in the ac circuit, a voltage feedback signal Vofb that is indicative of the dc voltage in the dc circuit and which is provided by a dc voltage sensor 50, and a look-up table of circuit losses versus dc output power. The power demand signal Powerr is normally supplied by the user of the dc energy store 2 to request that the dc energy store circuit supplies a defined value of ac supply power (e.g. 1.0 MW). The normal reason for doing this is to control the flow of power into, and out of, the ac supply 6 to meet the power demand being made by other users of the ac supply. The power flow can also be used to either control the stability or frequency of the ac supply 6 or for any other use that is required by the user.

The derivation of the current demand signal Ior will be explained in more detail below.

The current demand signal Ior is limited in a current limiter 52 to prevent the circuit from tripping on over-current if an excessive demand is made through the power demand signal Powerr. The output of the current limiter 52 is a limited version of the current demand signal Iorl. As described in more detail below with reference to FIG. 3, the maximum permitted current can be defined by a current limit signal Ilimit provided by the dc energy store 2 or its control system (not shown). This means that if the current demand signal Ior is either less than, or equal to, the current limit signal Ilimit then the current demand signal Ior is not limited (i.e. Iorl=Ior). However, if the current demand signal Ior is greater than the current limit signal Ilimit then the current demand signal Ior is limited to the maximum permitted current (i.e. Iorl=Ilimit). The maximum permitted current set by the current limit signal Ilimit can be fixed or varied in accordance with the operational parameters of the dc energy store 2.

The limited version of the current demand signal Iorl is compared against a current feedback signal Iofb that is indicative of the dc current in the dc circuit and which is provided by dc current sensor 54. The same signal could also be achieved by measuring the three dc currents in the dc reactors 18 and adding the signals.

The comparison between the limited version of the current demand signal Iorl and the current feedback signal Iofb is made in a P+I current loop amplifier 56 to give a voltage demand signal Vor for the DC/DC power converter 14. The voltage demand signal Vor is a dc signal that is turned into the correct firing commands for the semiconductor power switching devices of the DC/DC power converter 14 using a phase angle input to achieve the required dc output current. The voltage demand signal Vor is a dc signal whose magnitude is varied to achieve the required dc current, however if a fixed value of output current is required then the voltage demand signal Vor will be a dc signal of constant amplitude.

The voltage demand signal Vor is turned into firing commands in a PWM modulator 58. As a dc output is required the phase angle signal of the PWM modulator 58 is set to zero.

2.3 Power Calculations

With reference to FIG. 2, the following equations apply when the dc energy store 2 is being discharged, i.e. when power from the dc energy store is supplied to the ac supply 6:

$$Aac = Bdc - Lac \quad (EQ1)$$

$$Cdc = Ddc - Ldc \quad (EQ2)$$

$$Ddc = Vo \cdot Io \quad (EQ3)$$

where:

Aac is the required ac power at point 'A' (i.e. at the ac supply);
Bdc is the dc power at point 'B' (i.e. at the dc terminals of the AC/DC power converter 4);

Cdc is the dc power at point 'C' (i.e. at the dc terminals of the DC/DC power converter 14 at the AC/DC power converter side);

Ddc is the dc power at point 'D' (i.e. at the dc energy store 2);

Lac is the losses in the ac circuit between the ac supply 6 and the AC/DC power converter 4;

Ldc is the losses in the dc circuit 20 between the DC/DC power converter 14 and the dc energy store 2;

Vo is the dc output voltage, i.e. the dc voltage in the dc circuit; and

Io is the dc output current, i.e. the dc current in the dc circuit.

If the dc link voltage is held constant by the action of the quadrature axis error amplifier 38 and the P+I volts amplifier 34 then the dc power at point 'B' must equal the dc power at point 'C'.

Equations EQ1 to EQ3 can therefore be combined to provide the following equation for controlling the ac power of the ac supply 6:

$$Io = \frac{(Aac + Ldc + Lac)}{Vo} \quad (EQ4)$$

Auxiliary systems (not shown—but see above) take energy from the ac supply 6 and equation EQ4 can be further modified to include losses in the auxiliary systems (Laux):

$$Io = \frac{(Aac + Ldc + Lac + Laux)}{Vo} \quad (EQ5)$$

Equations EQ4 and EQ5 form the basis for the accurate control of the ac power in the ac supply 6 as the circuit losses are typically low and the dc energy store circuit has a very dynamic response without an overall ac power loop. When power is being supplied from ac supply 6 to the dc energy store 2 (i.e. when the dc energy store is being charged) then the same equations EQ4 and EQ5 can be used but the polarity of the loss terms is reversed.

It will therefore be readily appreciated that the power calculation unit 48 can determine the current demand signal Ior (indicative of the required dc output current Io) on the basis of the power demand signal Powerr (indicative of the required ac power at point 'A' Aac), the voltage feedback signal Vofb (indicative of the required dc output voltage Vo) and a look-up table which is used to calculate the various losses (Ldc and Lac and optionally also Laux) in the dc energy store circuit on the basis of the dc output power.

To improve the dynamic response of the dc energy store circuit the current signal IQ2 can be used to send a demand to the AC/DC power converter 4 as soon as a new power demand is made by the power demand signal Powerr. If the current signal IQ2 is used then a voltage feedback signal VACfb from the PLL unit 26 needs to be supplied to the power calculation unit 48 as shown in FIG. 2.

In this case the current signal IQ2=Powerr/(VACfb×√3)

The dc energy store circuit is typically controlled so that the dc energy store 2 can store dc power at a value defined by the user when charged from the ac supply 6 and export ac power by discharging the dc energy store at a value defined by the user. The dc energy store circuit will typically be designed to have a fast ac power response, typically in one mains cycle for either a change from full power input to full power output, or from a change from full power output to full power input, without the need for a closed ac power loop since this would require sensors for providing a measured value of the ac power in the ac supply 6 which tend to be slow acting and expensive.

Additional features that can be added to the dc energy store circuit of FIG. 2 are shown in FIG. 3. A contactor or dc breaker 60 is added to the dc circuit 20 to enable the dc energy store 2 to be isolated for maintenance or protective reasons. A control signal Estorer is compared against the voltage feedback signal Vofb in a start-up amplifier 62. The output signal of the start-up amplifier 62 is supplied to the P+I current loop amplifier 56 by means of a switch 64 and is used to preset the output of the P+I current loop amplifier to give a net zero voltage across the dc breaker 60 when the dc energy store circuit is starting. The dc breaker 60 can therefore be closed without any transient and the switch 64 can be opened so that normal operation of the dc energy store 2 can commence. It is also possible to omit the use of the start-up amplifier 62 and to connect the control signal Estorer directly to the switch 64. This is less accurate but may be of sufficient accuracy that it can be used in practice.

It can be useful to determine if the dc energy store 2 is overloading and needs to operate at a lower dc current. A current limit signal Ilimit can therefore be provided from the dc energy store 2 to the current limiter 52. The current limit signal Ilimit is calculated by the control system (not shown) of the dc energy store 2 and will normally be set to a defined maximum permitted current value to protect the dc energy store. However, if any parts of the dc energy store 2 are being stressed, for example getting too hot, then the current limit signal Ilimit can be reduced accordingly to keep the dc energy store circuit operating without the need to trip and shutdown.

The current limit signal Ilimit is normally continuously provided to the current limiter 52. The current limiter 52 can operate in several different ways:

(i) If the power demand signal Powerr results in a dc current set by the current demand signal Ior that is less than, or equal to, the current limit signal Ilimit then the dc energy store circuit will supply the requested power or absorb the requested power depending on the direction of power flow. The current limiter 52 has positive and negative limits that are controlled by the current limit signal Ilimit so the same operation applies when the dc energy store 2 is being charged and discharged. If the current signal IQ2 is being used then IQ2=Powerr/(VACfb×√3).

(ii) If the dc energy store 2 is supplying power then its dc voltage will fall and this is measured by the dc voltage sensor 54. The result is that the current demand signal Ior for a requested power will increase and can give a current demand signal Ior that is greater than the current limit signal Ilimit. The supplied power will then be defined as the dc voltage multiplied by the value of the current limit signal Ilimit. A control signal InLimit is then sent to the power calculation unit 48 to notify the power calculation unit 48 that the power requested by the power demand signal Powerr cannot be supplied. In this mode only the limit of the current limiter 52 for supplying power will operate. If the power calculation unit 48 receives the control signal InLimit then it issues a warning to the user of the dc energy store circuit that it is operational but that it is unable to supply the requested power. If the current signal IQ2 is being used then IQ2= (Vofb×Ilimit)/(VACfb×√3).

(iii) If the power demand signal Powerr is set at a value that gives a current demand signal Ior that is greater than the current limit signal Ilimit then the supplied power will be defined as the dc voltage multiplied by the value of the current limit signal Ilimit. A control signal InLimit is then sent to the power calculation unit 48 to notify the power calculation unit 48 that the power requested by the power demand signal Powerr cannot be supplied or absorbed. The current limiter 52 has positive and negative limits that are controlled by the current limit signal Ilimit so the same operation applies when the dc energy store 2 is being charged and discharged. If the power calculation unit 48 receives the control signal InLimit then it issues a warning to the user of the dc energy store circuit that it is operational but that it is unable to supply or absorb the requested power. If the current signal IQ2 is being used then IQ2=(Vofb×Ilimit)/(VACfb×√3).

(iv) If the dc energy store is either supplying or absorbing power over a prolonged period then it may exceed its correct operating conditions. The result is that the current limit signal Ilimit will reduce and if it reaches a value where the current demand signal Ior is greater than the current limit signal Ilimit then the power supplied will be defined as the dc voltage multiplied by the value of the current limit signal Ilimit. A control signal InLimit is then sent to the power calculation unit 48 to notify the power calculation unit 48 that the power requested by the power demand signal Powerr cannot be supplied or absorbed. The current limiter 52 has positive and negative limits that are controlled by the current limit signal Ilimit so the same operation applies when the dc energy store 2 is being charged and discharged. If the power calculation unit 48 receives the control signal InLimit then it issues a warning to the user of the dc energy store circuit that it is operational but that it is unable to supply or absorb the requested power. If the current signal IQ2 is being used then IQ2=(Vofb×Ilimit)/(VACfb×√3).

The dc energy store circuit has a very fast dynamic response but it relies on estimates of the losses as defined in equation EQ5. If more accurate control is needed then a set of power sensors 66 can be included in the ac circuit between the transformer 8 and the ac supply 6 to provide a power feedback signal Poutfb which is indicative of the actual ac power. The power feedback signal Poutfb is supplied to the power calculation unit 48 where it is used to apply a slow acting correction of the loss terms used in equation EQ5. If this feature is required then the power demand signal Powerr and the power feedback signal Poutfb are compared in a slow acting P+I amplifier within the power calculation unit 48 to give an additional error signal that is added to the current demand signal Ior. This will result in achieving the required accuracy. The dc energy store circuit will have the same fast response due to the use of equation EQ5 followed by a slower acting P+I correcting term to eliminate any small errors, if any.

Although not shown, the dc energy store circuit can be extended to have a plurality of dc energy stores connected to a common dc link by a respective DC/DC power converter and dc circuit. Each DC/DC power converter will be controlled by its own controller (the controllers for each DC/DC power converter optionally being integrated as a single physical controller) but with a common power calculation unit 48 for all of the dc energy stores.

In the case where there are two dc energy stores then the power calculation unit 48 uses a common power demand signal Powerr, first and second voltage feedback signals Vofb1 and Vofb2 indicative of the required dc output voltages Vo1 and Vo1 in the dc circuit of each dc energy store, and first and second current limit signals Ilimit1 and Ilimit 2 indicative of the maximum permitted current for each dc energy store to derive first and second current demand signals Ior1 and Ior2 that are applied to the respective current limiter of each controller. All of the other control circuits shown in FIGS. 2 and 3 act independently.

When the dc energy store 2 is being discharged, the first and second current demand signals Ior1 (indicative of the required dc current Io1 in the dc circuit of the first dc energy store) and Ior2 (indicative of the required dc current Io2 in the dc circuit of the second dc energy store) are derived on the basis of the following equations and depend on the state of the first and second control signals Ilimit1 and Ilimit2 supplied by the respective current limiter of each controller to the common power calculation unit 48 as follows:

(i) If the dc currents set by the first and second current demand signals Ior1 and Ior2 that are less than, or equal to, the first and second current limit signals Ilimit1 and Ilimit2, respectively, then the first and second dc energy stores will supply the requested power as follows:

$$Io1 = \frac{\left(\frac{Aac}{2} + Ldc1 + Lac1 + Laux1\right)}{Vo1} \quad (EQ6)$$

$$Io2 = \frac{\left(\frac{Aac}{2} + Ldc2 + Lac2 + Laux2\right)}{Vo2} \quad (EQ7)$$

where:

Lac1 is the losses in the ac circuit between the ac supply and the AC/DC power converter due to the first dc energy store;

Ldc1 is the losses in the dc circuit between the DC/DC power converter and the first dc energy store;

Laux1 is the losses in the auxiliary systems of the first dc energy store;

Vo1 is the dc voltage in the dc circuit for the first dc energy store;

Lac2 is the losses in the ac circuit between the ac supply and the AC/DC power converter due to the second dc energy store;

Ldc2 is the losses in the dc circuit between the DC/DC power converter and the second dc energy store;

Laux2 is the losses in the auxiliary systems of the second dc energy store; and

Vo2 is the dc voltage in the dc circuit for the second dc energy store.

(ii) If the dc current set by the first current demand signal Ior1 is greater than the first current limit signal Ilimit1 and the dc current set by the second current demand signal Ior2 is less than, or equal to, the second current signal Ilimit2 then the dc energy stores will supply the power Pes1 at the terminals of the first dc energy store as follows:

$$Io1 = Ilmt1 \quad (EQ8)$$

where:

Ilmt1 is the maximum permitted current value set by the first current limit signal Ilimit1

$$Pes1 = Ilmt1 \cdot Vo1 \quad (EQ9)$$

where:
Pes1 is the power supplied by the first dc energy store at its terminals $$Io2 = \frac{\left(\begin{array}{c} Aac - Pes1 + Ldc1 + Ldc2 + \\ Lac1 + lac2 + Laux1 + Laux2 \end{array}\right)}{Vo2} \quad \text{(EQ10)}$$

(iii) If the dc current set by the second current demand signal Ior2 is greater than the second current limit signal Ilimit2 and the dc current set by the first current demand signal Ior1 is less than, or equal to, the first current signal Ilimit1 then the first and second dc energy stores will supply power Pes2 at the terminals of the second dc energy store as follows:

$$Io2 = Ilmt2 \quad \text{(EQ11)}$$

where:
Ilmt2 is the maximum permitted current value set by the second current limit signal Ilimit2

$$Pes2 = Ilmt2 \cdot Vo2 \quad \text{(EQ12)}$$

where:
Pes2 is the power supplied by the second dc energy store at its terminals $$Io1 = \frac{\left(\begin{array}{c} Aac - Pes2 + Ldc1 + Ldc2 + \\ Lac1 + Lac2 + Laux1 + Laux2 \end{array}\right)}{Vo1} \quad \text{(EQ13)}$$

(iv) If the dc currents set by the first and second current demand signals Ior1 and Ior2 are greater than the first and second current limit signals Ilimit1 and Ilimit2, respectively, then the first and second dc energy stores will supply the requested power as follows:

$$Io1 = Ilmt1 \quad \text{(EQ14)}$$

$$Io2 = Ilmt2 \quad \text{(EQ15)}$$

$$Pes1 = Ilmt1 \cdot Vo1 \quad \text{(EQ16)}$$

$$Pes2 = Ilmt2 \cdot Vo2 \quad \text{(EQ17)}$$

In this situation the dc energy stores are operating but are unable to supply the requested power. Also the power calculation unit 48 will issue a warning to the user of the dc energy store circuit that it is operational but that it is unable to supply or absorb the requested power. If the current signal IQ2 is being used then IQ2=(Vofb1× Ilimit1)/(VACfb×√3)+(Vofb2×Ilimit2)/(VACfb×√3).

When the dc energy store 2 is being charged then the same equations EQ6 to EQ17 can be used but the polarity of the loss terms is reversed.

It will be readily appreciated that the same equations can also be adapted for any number of dc energy stores. In general terms the power calculation unit will derive a current demand signal for each dc energy store based on a common power demand signal, a voltage feedback signal for each dc energy store and a current limit signal for each dc energy store.

3. Self-Supporting Operating Mode Shown in FIGS. 4 and 5

The self-supporting operating mode is used when the ac supply 6 is no longer available for any reason (e.g. a fault that interrupts or the ac supply) and the power in the dc energy store 2 is used to supply power to the auxiliary systems 68 that would normally take energy from the ac supply. Although the auxiliary systems 68 are shown at the left-hand side of FIGS. 4 and 5 it will be readily appreciated that in practice they will be physically located at or near to the dc energy store 2 with which they are associated and used. Those parts of the dc energy store circuit that are the same as those shown in FIGS. 2 and 3 have been given the same reference numeral.

In the self-supporting mode the dc energy store circuit is isolated from the ac supply 6 by opening a switch (not shown) or other suitable isolating device. This ensures that a fault on the ac supply 6 does not prevent the dc energy store circuit from operating in the self-supporting mode.

During the self-supporting operating mode, the auxiliary systems 68 receive power from the dc energy store 2 by means of the AC/DC power converter 4 and the ac circuit to which the auxiliary systems are connected. This means that the auxiliary systems 68 can resume normal operation as soon as the main ac supply 6 is restored and it is also possible to maintain normal operation of the dc energy store 2 or, if necessary, shut down the dc energy store and maintain optimal shutdown conditions. In other words, the fans, pumps etc. that are necessary for the proper and safe operation of the dc energy store 2 can continue to operate even if the ac supply 6 is lost.

It will be readily appreciated that during the self-supporting operating mode the dc energy store 2 is only discharged (i.e. dc power is supplied from the dc energy store to the ac supply 6 and hence to the auxiliary systems 68 by means of the associated ac circuit. The control of the AC/DC and DC/DC power converters 4, 14 is therefore simplified to a certain degree because there is no need to provide bi-directional power flow.

3.1 AC/DC Power Converter Control

The controller 24 for the AC/DC power converter 4 includes an ACV unit 70 that provides a voltage feedback signal VACfb. The voltage feedback signal VACfb is derived from measured ac voltage signals from ac voltage sensors 72 in the ac circuit and is indicative of the actual ac voltage in the ac circuit.

The voltage feedback signal VACfb is compared against a voltage demand signal VACsr that is typically preset to give the correct ac voltage for the auxiliary systems 68. The comparison between the voltage feedback signal VACfb and the voltage demand signal VACsr is made in a P+I volts amplifier 74 to give a voltage demand signal VACr for the AC/DC power converter 4. The voltage demand signal VACr is a dc signal that is turned into the correct firing commands for the semiconductor power switching devices of the AC/DC power converter 4. The result is to achieve an ac voltage in the ac circuit that is defined by the voltage demand signal VACsr. The frequency of the ac supply is determined by a preset ac supply frequency signal ACF that is supplied to the PWM modulator 76 together with the voltage demand signal VACr. The ac supply frequency signal ACF is typically preset to give the correct ac frequency for the auxiliary systems 68.

The ac current sensors 30 in the ac circuit provide a trip signal TRIP which shuts down the dc energy store circuit if a maximum permitted ac current is exceeded.

3.2 DC/DC Power Converter Control

The controller 46 for the DC/DC power converter 14 operates in a similar manner to the controller described above. However, there is no power calculation unit and the current demand signal Ior indicative of the required dc current in the dc circuit is derived by comparing a voltage feedback signal VDCbus that is indicative of the dc link voltage and a voltage demand signal VDCr that is within the rating limits of the AC/DC and DC/DC power converters 4, 14 (e.g. 1 kV dc).

The comparison between the voltage feedback signal VDCbus and the voltage demand signal VACr is made in a P+I volts amplifier 78.

The current demand signal Ior is limited in the current limiter 52 to prevent the circuit from tripping on over-current. The voltage demand signal Vor is turned into firing commands in the PWM modulator 58.

Figure 4:
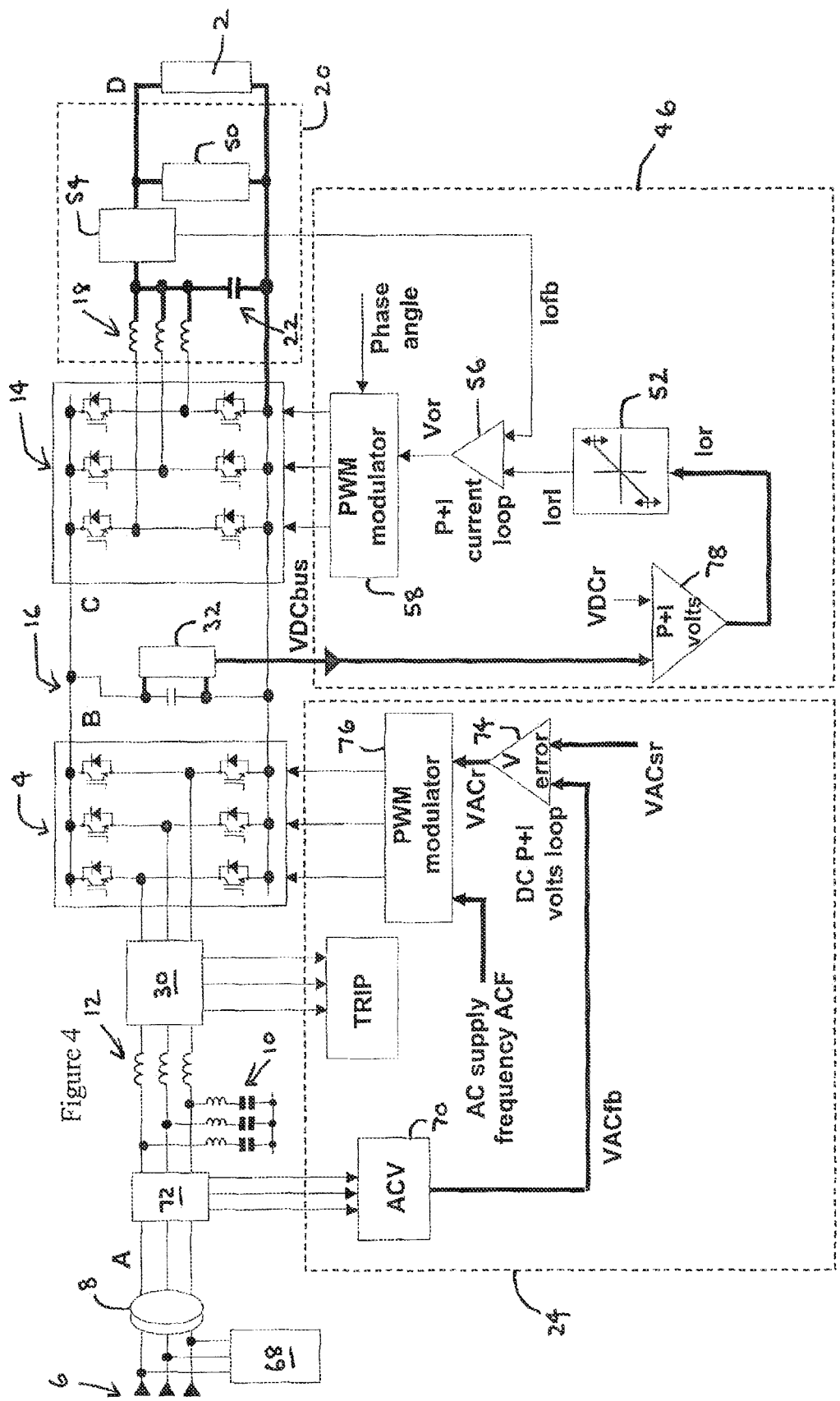
FIG. 4 is a schematic drawing showing the controller arrangement when the dc energy store is operating in a self-supporting mode.

With reference to FIG. 4, the following equations apply when the dc energy store 2 is being discharged, i.e. when power is being supplied from the dc energy store to the auxiliary systems 68.

$$Aac = Bdc - Lac \quad (EQ18)$$

where:
Aac is the required ac power at point 'A' (i.e. at the ac supply);
Bdc is the dc power at point 'B' (i.e. at the dc terminals of the AC/DC power converter 4); and
Lac is the losses in the ac circuit between the ac supply 6 and the AC/DC power converter 4.

If the dc link voltage is held constant by the action of the P+I volts amplifier 78 then the dc power at point 'B' and at point 'C' must be the same which mean that correct power is being supplied from the dc energy store 2.

Figure 5:
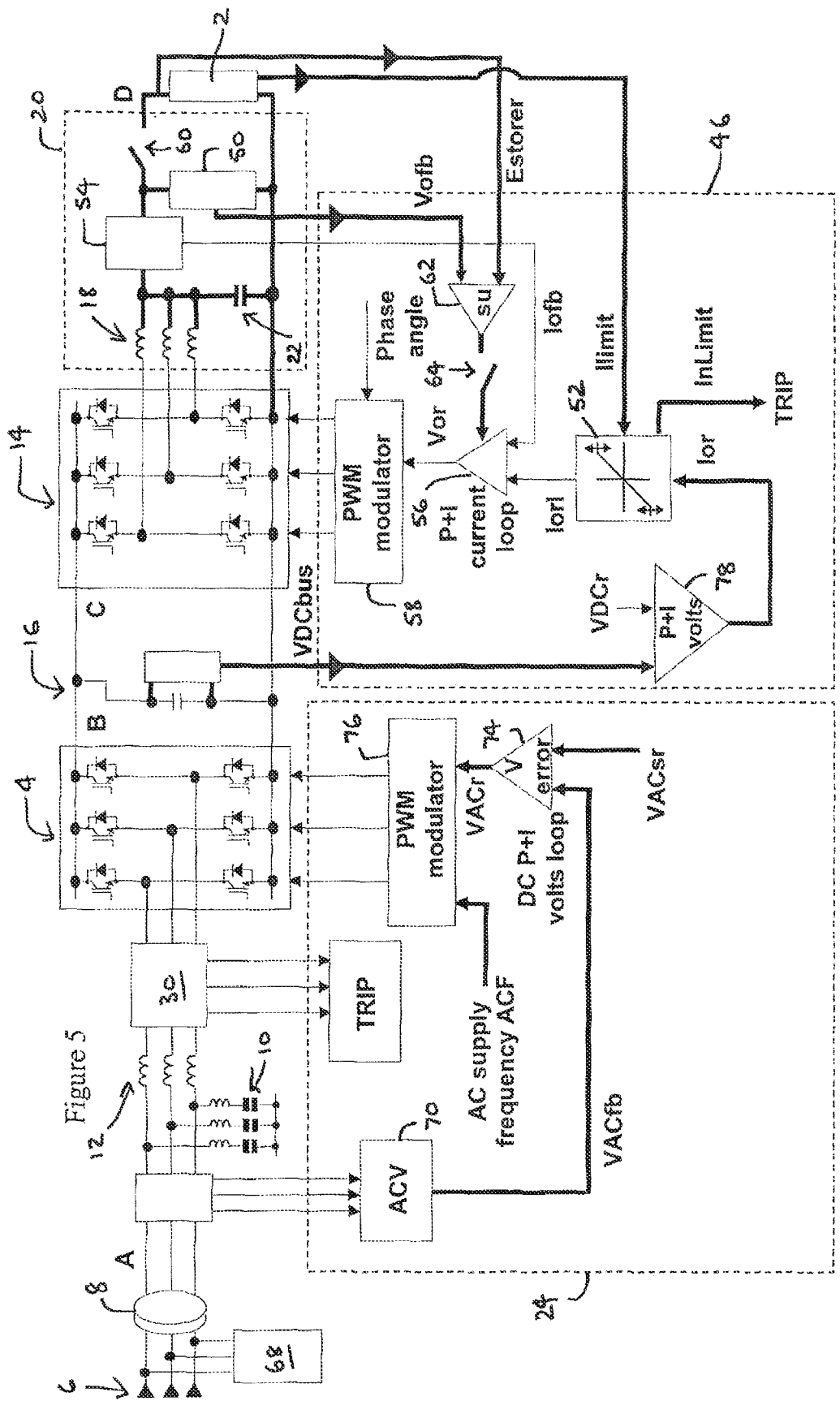
FIG. 5 is a schematic drawing showing an alternative controller arrangement when the dc energy store is operating in a self-supporting mode.

Additional features that can be added to the dc energy store circuit of FIG. 4 are shown in FIG. 5. A contactor or dc breaker 60 is added to the dc circuit 20 to enable the dc energy store 2 to be isolated for maintenance or protective reasons. A control signal Estorer is compared against the voltage feedback signal Vofb in a start-up amplifier 62. The output signal of the start-up amplifier 62 is supplied to the P+I current loop amplifier 56 by means of a switch 64 and is used to preset the output of the P+I current loop amplifier to give a net zero voltage across the dc breaker 60 when the dc energy store circuit is starting. The dc breaker 60 can therefore be closed without any transient and the switch 64 can be opened so that normal operation of the dc energy store 2 can commence. It is also possible to omit the use of the start-up amplifier 62 and to connect the control signal Estorer directly to the switch 64. This is less accurate but may be of sufficient accuracy that it can be used in practice.

It can be useful to determine if the dc energy store 2 is overloading and needs to operate at a lower dc current. A current limit signal Ilimit can therefore be provided from the dc energy store 2 to the current limiter 52. The current limit signal Ilimit is calculated by the control system (not shown) of the dc energy store 2 and will normally be set to a defined maximum permitted current value to protect the dc energy store. If the dc current exceeds the current limit signal Ilimit then a control signal InLimit provided by the current limiter 52 causes the system to trip.

Although not shown the dc energy store circuit can be extended to have a plurality of dc energy stores connected to a common dc link by a respective DC/DC power converter and dc circuit. Each DC/DC power converter will be controlled by its own controller (the controllers for each DC/DC power converter optionally being integrated as a single physical controller) but with a common P+I volts amplifier feeding a common current demand signal Ior into separate current limiters for each dc energy store.

In the case where there are two dc energy stores then the current limiters use first and second current limit signals Ilimit1 and Ilimit 2 indicative of the maximum permitted current for each dc energy store to derive first and second limited current demand signals Iorl1 and Iorl2 that are applied to the respective P+I current loop amplifier 56 of each controller. All of the other control circuits shown in FIGS. 4 and 5 act independently.

The operation of the dc energy store circuit depends on the first and second current limit signals Ilimit1 and Ilimit2 as follows:

(i) If the dc currents set by the current demand signal Ior are less than, or equal to, the first and second current limit signals Ilimit1 and Ilimit2, respectively, then the first and second dc energy stores will automatically supply 50% of the requested power.

(ii) If the dc current set by the current demand signal Ior is greater than the first current limit signal Ilimit1 and the dc current set by the current demand signal Ior is less than, or equal to, the second current signal Ilimit2 then the first dc energy store will continue to operate but at the current defined by the first current limit signal Ilimit1. The common P+I volts amplifier 78 will respond to this and will change the current demand signal Ior so that the second dc energy store will automatically supply a current sufficient to supply the requested power. This keeps the overall system operational.

(iii) If the dc current set by the current demand signal Ior is greater than the second current limit signal Ilimit2 and the dc current set by the current demand signal Ior is less than, or equal to, the first current signal Ilimit1 then the second dc energy store will continue to operate but at the current defined by the second current limit signal Ilimit2. The common P+I volts amplifier 78 will respond to this and will change the current demand signal Ior so that the first dc energy store will supply a current sufficient to supply the requested power. This keeps the overall system operational.

(iv) If the dc currents set by the current demand signal Ior are greater than the first and second current limit signals Ilimit1 and Ilimit2 then the first and second dc energy stores will trip and the system will stop operating.

It will be readily appreciated that the same operation can also be adapted for any number of dc energy stores.

4. Island Operating Mode Shown in FIGS. 6 and 7

The island operating mode is used when the dc energy store 2 is the main provider of power to external loads connected to the ac supply 6. Additional generators can also be supplying power to the ac supply 6 at the same time. Power is also supplied to the auxiliary systems (not shown) of the dc energy store 2. Those parts of the dc energy store circuit that are the same as those shown in FIGS. 2 to 5 have been given the same reference numeral.

During the island operating mode, the ac supply 6 receives power from the dc energy store 2 by means of the AC/DC power converter 4. It will be readily appreciated that during the island operating mode the dc energy store 2 is only discharged (i.e. dc power is supplied from the dc energy store to the ac supply 6). The control of the AC/DC and DC/DC power converters 4, 14 is therefore simplified to a certain degree because there is no need to provide bi-directional power flow.

4.1 AC/DC Power Converter Control

The controller 24 for the AC/DC power converter 4 includes an ACV & ACF unit 80 that provides a voltage feedback signal VACfb and a frequency feedback signal FACfb. The voltage feedback signal VACfb and frequency feedback signals FACfb are derived from measured ac voltage signals from ac voltage sensors 72 in the ac circuit and are indicative of the actual ac voltage and ac frequency in the ac circuit, respectively.

The voltage feedback signal VACfb is compared against a voltage demand signal VACsr that is typically preset to give the correct ac voltage for the ac supply 6.

The comparison between the voltage feedback signal VACfb and the voltage demand signal VACsr is made in a P+I volts amplifier 74 to give a voltage demand signal VACr for the AC/DC power converter 4. The frequency feedback signal FACfb is a compared against a frequency demand signal FACsr that is typically preset to give the correct ac frequency for the ac supply 6.

The comparison between the frequency feedback signal FACfb and the frequency demand signal FACsr is made in a P+I volts amplifier 82 to give a frequency demand signal FACr for the AC/DC power converter 4.

The voltage demand signal VACr and frequency demand signal FACr are dc signals that are turned into the correct firing commands for the semiconductor power switching devices of the AC/DC power converter 4 by the PWM modulator 76. The result is to achieve an ac voltage in the ac circuit that is defined by the voltage demand signal VACsr and an ac supply frequency that is held constant as the load on the ac supply changes or which has a droop characteristic to share load with any other generators connected to the ac supply 6.

The ac current sensors 30 in the ac circuit provide a trip signal TRIP which is used shut down the dc energy store circuit.

4.2. DC/DC Power Converter Control

The controller 46 for the DC/DC power converter 14 operates as described above.

Figure 6:
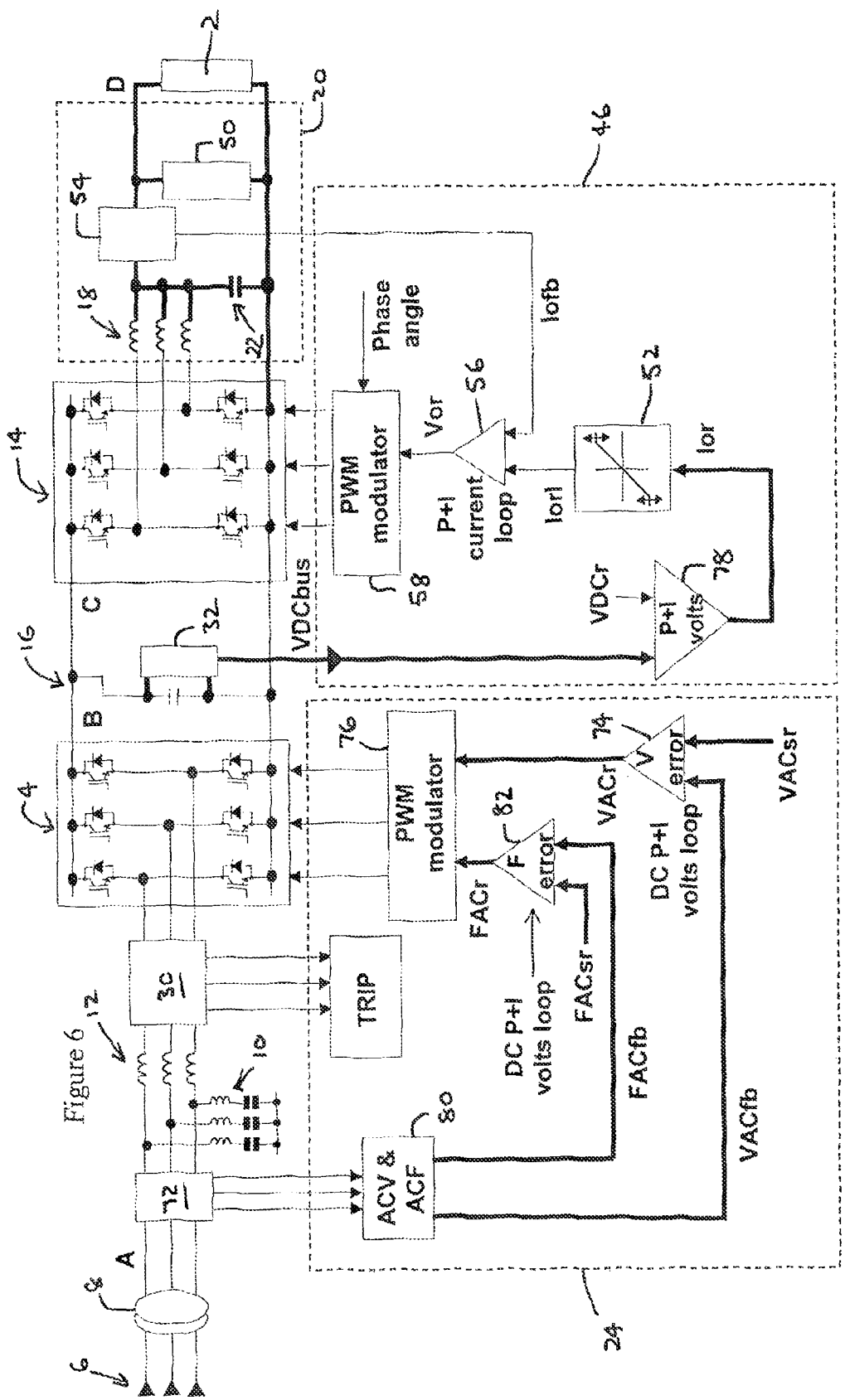
FIG. 6 is a schematic drawing showing the controller arrangement when the dc energy store is operating in an island mode.
Figure 7:
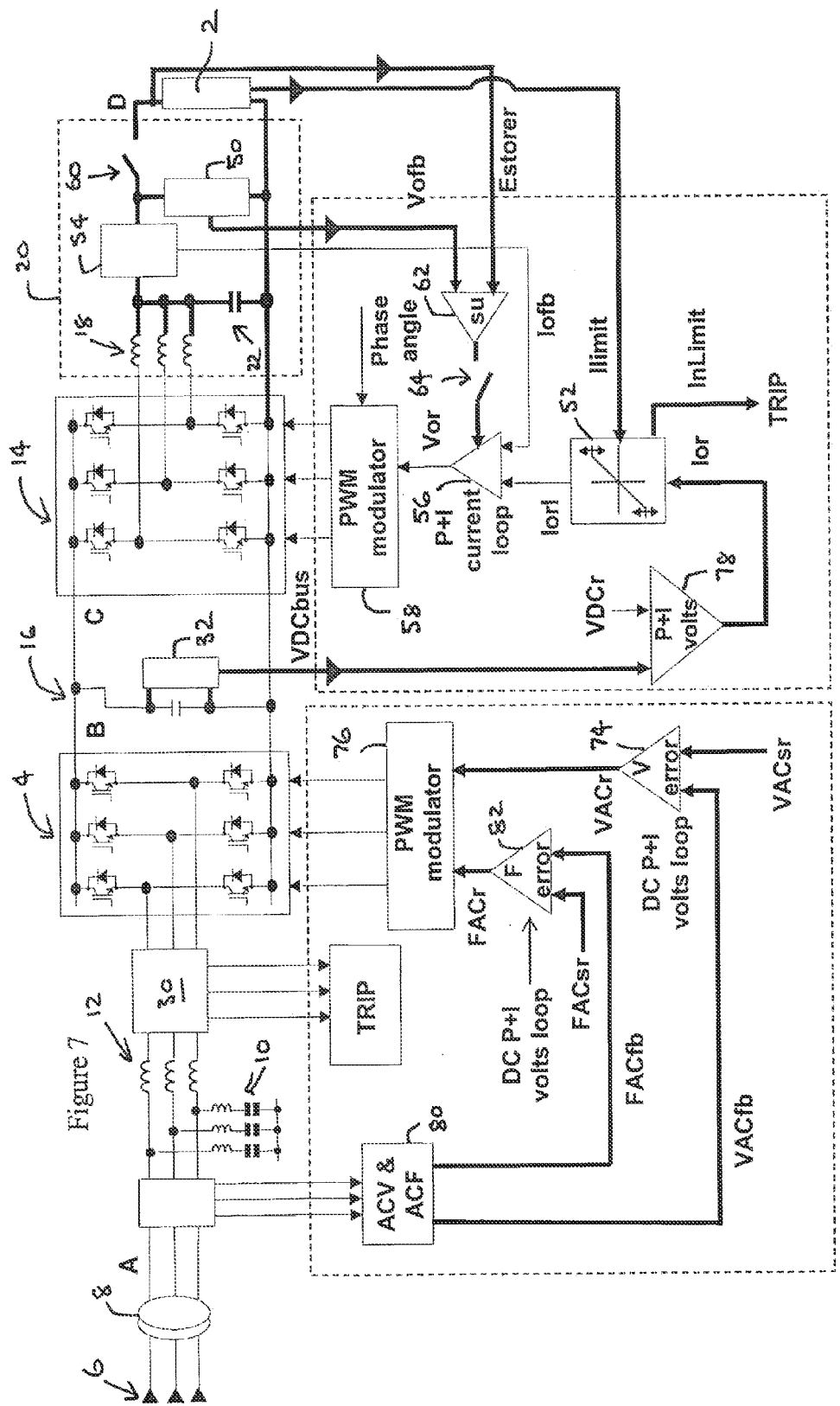
FIG. 7 is a schematic drawing showing an alternative controller arrangement when the dc energy store is operating in an island mode.

Additional features that can be added to the dc energy store circuit of FIG. 6 are shown in FIG. 7. A contactor or dc breaker 60 is added to the dc circuit 20 to enable the dc energy store 2 to be isolated for maintenance or protective reasons. A control signal Estorer is compared against the voltage feedback signal Vofb in a start-up amplifier 62. The output signal of the start-up amplifier 62 is supplied to the P+I current loop amplifier 56 by means of a switch 64 and is used to preset the output of the P+I current loop amplifier to give a net zero voltage across the dc breaker 60 when the dc energy store circuit is starting. The dc breaker 60 can therefore be closed without any transient and the switch 64 can be opened so that normal operation of the dc energy store 2 can commence. It is also possible to omit the use of the start-up amplifier 62 and to connect the control signal Estorer directly to the switch 64. This is less accurate but may be of sufficient accuracy that it can be used in practice.

It can be useful to determine if the dc energy store 2 is overloading and needs to operate at a lower dc current. A current limit signal Ilimit can therefore be provided from the dc energy store 2 to the current limiter 52. The current limit signal Ilimit is calculated by the control system (not shown) of the dc energy store 2 and will normally be set to a defined maximum permitted current value to protect the dc energy store. If the dc current exceeds the current limit signal Ilimit then a control signal InLimit provided by the current limiter 52 causes the system to trip.

Although not shown the dc energy store circuit can be extended to have a plurality of dc energy stores connected to a common dc link by a respective DC/DC power converter and dc circuit. Each DC/DC power converter will be controlled by its own controller (the controllers for each DC/DC power converter optionally being integrated as a single physical controller) but with a common P+I volts amplifier feeding a common current demand signal Ior into separate current limiters for each dc energy store.

In the case where there are two dc energy stores then the current limiters use first and second current limit signals Ilimit1 and Ilimit 2 indicative of the maximum permitted current for each dc energy store to derive first and second limited current demand signals Iorl1 and Iorl2 that are applied to the respective P+I current loop amplifier 56 of each controller. All of the other control circuits shown in FIGS. 6 and 7 act independently.

The operation of the dc energy store circuit depends on the first and second current limit signals Ilimit1 and Ilimit2 as follows:

(i) If the dc currents set by the current demand signal Ior is less than, or equal to, the first and second current limit signals Ilimit1 and Ilimit2, respectively, then the first and second dc energy stores will automatically supply 50% of the requested power.

(ii) If the dc current set by the current demand signal Ior is greater than the first current limit signal Ilimit1 and the dc current set by the current demand signal Ior is less than, or equal to, the second current signal Ilimit2 then the first dc energy store will continue to operate but at the current defined by the first current limit signal Ilimit1. The common P+I volts amplifier 78 will respond to this and will change the current demand signal Ior so that the second dc energy store will automatically supply a current sufficient to supply the requested power. This keeps the overall system operational.

(iii) If the dc current set by the current demand signal Ior is greater than the second current limit signal Ilimit2 and the dc current set by the current demand signal Ior is less than, or equal to, the first current signal Ilimit1 then the second current signal will continue to operate but at the current defined by the second current limit signal Ilimit2. The common P+I volts amplifier 78 will respond to this and will change the current demand signal Ior so that the first dc energy store will automatically supply a current sufficient to supply the requested power. This keeps the overall system operational.

(iv) If the dc currents set by the current demand signal Ior are greater than the first and second current limit signals Ilimit1 and Ilimit2 then the first and second dc energy stores will trip and the system will stop operating.

It will be readily appreciated that the same operations can also be adapted for any number of dc energy stores.

Some of the main technical benefits of the dc energy store circuits of the present invention are:
  for the self-supporting operating mode, the ability to supply auxiliary systems associated with the dc energy store with power when the ac supply is lost, thereby allowing normal operation to resume as soon as the main ac supply is restored or the ability to shut down and cool the dc energy store to maintain optimal shutdown conditions
  the use of standard IGBT PWM inverters as the AC/DC and DC/DC power converters 4, 14
  the ability to store and export power with any type of dc energy store
  the ability to import ac power and store as dc electrical power at a value defined by the user
  the ability to export ac power by releasing stored dc electrical power at a value defined by the user
  a fast ac power response without using a closed ac power loop
  the ability to use an optional contactor or dc breaker to disconnect the dc energy store for either isolation, maintenance or protective reasons
  the use of optional circuits to close on to a dc energy store with a pre-existing voltage without experiencing a current surge
  the use of optional circuits to limit the current flowing in to and out of the dc energy store the use of optional circuits to provide a closed loop power trim to increase the accuracy of the power that is imported or exported while still retaining a dynamic response the ability to use more than one dc energy store on the dc terminals of the inverter circuit for the island operating mode, the ability to be the main provider of power to a series of external loads that can optionally have other generators connected for the island operating mode, the ability to keep the external loads operating when the ac supply is lost and/or the ability to work in parallel with other ac generators

What is claimed is:

1. A dc energy store circuit comprising:
   a dc energy store having auxiliary systems and dc terminals;
   an AC/DC power converter including a plurality of semiconductor power switching devices, the AC/DC power converter having ac terminals that are electrically connected to an ac supply network and dc terminals;
   a DC/DC power converter including a plurality of semiconductor power switching devices, the DC/DC power converter having first dc terminals electrically connected to the dc terminals of the AC/DC power converter by means of a dc link and second dc terminals electrically connected to the dc terminals of the dc energy store;
   a first controller for the AC/DC power converter; and
   a second controller for the DC/DC power converter;
   wherein, when the dc energy store is operating in a self-supporting mode in which power is supplied from the dc energy store to the auxiliary systems of the dc energy store:
   the first controller uses a voltage demand signal indicative of desired ac voltage at the ac terminals of the AC/DC power converter to control the semiconductor power switching devices of the AC/DC power converter to achieve the desired level of ac voltage that corresponds to the voltage demand signal, the voltage demand signal being derived from a comparison of a voltage feedback signal and a second voltage demand signal that is preset to provide the desired ac voltage for the auxiliary systems of the dc energy store; and
   the second controller uses a current demand signal indicative of desired dc link current to control the semiconductor power switching devices of the DC/DC power converter to achieve the desired level of dc link current that corresponds to the current demand signal, the current demand signal being derived from a comparison of a dc link voltage demand signal indicative of desired dc link voltage and a dc link voltage feedback signal.

2. The dc energy circuit of claim 1, wherein the ac terminals of the AC/DC power converter are electrically connected to the ac supply network by means of a filter.

3. The dc energy circuit of claim 1, wherein the ac terminals of the AC/DC power converter are electrically connected to the ac supply network by means of a transformer.

4. The dc energy circuit of claim 1, wherein the ac terminals of the AC/DC power converter are electrically connected to the ac supply network by means of a filter and a transformer.

5. The dc energy circuit of claim 1, wherein the second dc terminals of the DC/DC power converter are electrically connected to the dc terminal of the dc energy store by means of dc inductors and filter capacitors.

6. The dc energy store circuit of claim 1, wherein the first controller includes a PWM modulator that derives firing commands for the semiconductor power switching devices of the AC/DC power converter on the basis of the voltage demand signal and the required frequency of the ac supply network.

7. The dc energy store circuit of claim 1, wherein, when the dc energy store is operating in an island mode in which power is supplied from the dc energy store to the ac supply network and the auxiliary systems of the dc energy store:
   the first controller uses a voltage demand signal indicative of desired ac voltage at the ac terminals of the AC/DC power converter to control the semiconductor power switching devices of the AC/DC power converter to achieve the desired level of ac voltage that corresponds to the voltage demand signal, the voltage demand signal being derived from a comparison of a voltage feedback signal and a second voltage demand signal that is preset to provide the desired ac voltage for the ac supply network, and
   the second controller uses a current demand signal indicative of desired dc link current to control the semiconductor power switching devices of the DC/DC power converter to achieve the desired level of dc link current that corresponds to the current demand signal, the current demand signal being derived from a comparison of a dc link voltage demand signal indicative of desired dc link voltage and a dc link voltage feedback signal.

8. The dc energy store circuit of claim 7, wherein the first controller includes a PWM modulator that derives firing commands for the semiconductor power switching devices of the AC/DC power converter on the basis of the voltage demand signal and a frequency demand signal, the frequency demand signal being derived from a comparison of a frequency feedback signal and a frequency demand signal that is preset to provide the desired ac frequency for the ac supply network.

9. The dc energy store circuit of claim 1, wherein the second controller includes a PWM modulator that derives firing commands for the semiconductor power switching devices of the DC/DC power converter on the basis of a voltage demand signal and a phase angle input, the voltage demand signal being derived from a comparison of a current feedback signal and one of the current demand signal or a limited version of the current demand signal obtained from a current limiter.

10. The dc energy store circuit of claim 1, wherein the second controller includes a current limiter that derives a limited version of the current demand signal using a current limit signal indicative of the maximum permitted current at the dc terminals of the dc energy store.

11. The dc energy store circuit of claim 10, wherein the current limiter provides a control signal if the current demand signal is greater than the current limit signal.

12. The dc energy store circuit of claim 1, wherein, when the dc energy store is operating in a normal mode in which power is supplied from the ac supply network to the dc energy store to charge the dc energy store or power is supplied from the dc energy store to the ac supply network to discharge the dc energy store:
   the first controller uses real and reactive current demand signals indicative of desired real and reactive current at the ac terminals of the AC/DC power converter to control the semiconductor power switching devices of the AC/DC power converter to achieve the desired level of real and reactive current that corresponds to the real and reactive current demand signals, the real current demand signal being derived from a comparison of a dc link voltage demand signal indicative of desired dc link voltage and a dc link voltage feedback signal; and the second controller uses a current demand signal indicative of desired dc current at the dc terminals of the dc energy store to control the semiconductor power switching devices of the DC/DC power converter to achieve the desired level of dc current that corresponds to the current demand signal, the current demand signal being derived by a power calculation unit on the basis of: (i) a power demand signal indicative of desired ac power at the ac terminals of the AC/DC power converter, (ii) a voltage feedback signal indicative of dc voltage at the dc terminals of the dc energy store, and (iii) any losses in the dc energy store circuit.

13. The dc energy store circuit of claim 12, wherein the current demand signal is further derived by the power calculation unit on the basis of a dc link feedback signal indicative of dc link voltage, and the real current demand signal is further derived from a current signal that is provided by the power calculation unit of the second controller.

14. The dc energy store circuit of claim 12, wherein the second controller includes a PWM modulator that derives firing commands for the semiconductor power switching devices of the DC/DC power converter on the basis of a voltage demand signal and a phase angle input, the voltage demand signal being derived from a comparison of a current feedback signal and one of the current demand signal or a limited version of the current demand signal obtained from a current limiter.

15. The dc energy store circuit of claim 12, wherein the second controller includes a current limiter that derives a limited version of the current demand signal using a current limit signal indicative of the maximum permitted current at the dc terminals of the dc energy store.

16. The dc energy store circuit of claim 15, wherein the current limiter provides a control signal to the power calculation unit if the current demand signal is greater than the current limit signal.

17. The dc energy store circuit of claim 12, wherein the current demand signal is further derived by the power calculation unit on the basis of a power feedback signal.

18. The dc energy store circuit of claim 1, further comprising a plurality of DC/DC power converter, each DC/DC power converter having first dc terminals electrically connected in parallel to the dc terminals of the AC/DC power converter and second dc terminals connected to a respective dc energy store.

19. A method of operating a dc energy store circuit comprising: a dc energy store having auxiliary systems; an AC/DC power converter including a plurality of semiconductor power switching devices, the AC/DC power converter having ac terminals that are electrically connected to an ac supply network and dc terminals; a DC/DC power converter including a plurality of semiconductor power switching devices, the DC/DC power converter having first dc terminals electrically connected to the dc terminals of the AC/DC power converter by means of a dc link and second dc terminals electrically connected to dc terminals of the dc energy store; a first controller for the AC/DC power converter; and a second controller for the DC/DC power converter;

wherein the method comprises the step of operating the dc energy store in a self-supporting mode in which power is supplied from the dc energy store to the auxiliary systems of the dc energy store such that:

the first controller uses a voltage demand signal indicative of desired ac voltage at the ac terminals of the AC/DC power converter to control the semiconductor power switching devices of the AC/DC power converter to achieve the desired level of ac voltage that corresponds to the voltage demand signal, the voltage demand signal being derived from a comparison of a voltage feedback signal and a second voltage demand signal that is preset to provide the desired ac voltage for the auxiliary systems of the dc energy store; and the second controller uses a current demand signal indicative of desired dc link current to control the semiconductor power switching devices of the DC/DC power converter to achieve the desired level of dc link current that corresponds to the current demand signal, the current demand signal being derived from a comparison of a dc link voltage demand signal indicative of desired dc link voltage and a dc link voltage feedback signal.

20. The method of claim 19, further comprising the step of operating the dc energy store in an island mode in which power is supplied from the dc energy store to the ac supply network and the auxiliary systems of the dc energy store such that:

the first controller uses a voltage demand signal indicative of desired ac voltage at the ac terminals of the AC/DC power converter to control the semiconductor power switching devices of the AC/DC power converter to achieve the desired level of ac voltage that corresponds to the voltage demand signal, the voltage demand signal being derived from a comparison of a voltage feedback signal and a second voltage demand signal that is preset to provide the desired ac voltage for the ac supply network, and the second controller uses a current demand signal indicative of desired dc link current to control the semiconductor power switching devices of the DC/DC power converter to achieve the desired level of dc link current that corresponds to the current demand signal, the current demand signal being derived from a comparison of a dc link voltage demand signal indicative of desired dc link voltage and a dc link voltage feedback signal.

21. The method of claim 19, further comprising the step of operating the dc energy store in a normal mode in which power is supplied from the ac supply network to the dc energy store to charge the dc energy store or power is supplied from the dc energy store to the ac supply network to discharge the dc energy store such that:

the first controller uses real and reactive current demand signals indicative of desired real and reactive current at the ac terminals of the AC/DC power converter to control the semiconductor power switching devices of the AC/DC power converter to achieve the desired level of real and reactive current that corresponds to the real and reactive current demand signals, the real current demand signal being derived from a comparison of a dc link voltage demand signal indicative of desired dc link voltage and a dc link voltage feedback signal; and the second controller uses a current demand signal indicative of desired dc current at the dc terminals of the dc energy store to control the semiconductor power switching devices of the DC/DC power converter to achieve the desired level of dc current that corresponds to the current demand signal, the current demand signal being derived by a power calculation unit on the basis of: (i) a power demand signal indicative of desired ac power at the ac terminals of the AC/DC power converter, (ii) a voltage feedback signal indicative of dc voltage at the dc terminals of the dc energy store, and (iii) any losses in the dc energy store circuit.

22. The method of claim 20, further comprising the step of operating the dc energy store in a normal mode in which power is supplied from the ac supply network to the dc energy store to charge the dc energy store or power is supplied from the dc energy store to the ac supply network to discharge the dc energy store such that:

the first controller uses real and reactive current demand signals indicative of desired real and reactive current at the ac terminals of the AC/DC power converter to control the semiconductor power switching devices of the AC/DC power converter to achieve the desired level of real and reactive current that corresponds to the real and reactive current demand signals, the real current demand signal being derived from a comparison of a dc link voltage demand signal indicative of desired dc link voltage and a dc link voltage feedback signal; and the second controller uses a current demand signal indicative of desired dc current at the dc terminals of the dc energy store to control the semiconductor power switching devices of the DC/DC power converter to achieve the desired level of dc current that corresponds to the current demand signal, the current demand signal being derived by a power calculation unit on the basis of: (i) a power demand signal indicative of desired ac power at the ac terminals of the AC/DC power converter, (ii) a voltage feedback signal indicative of dc voltage at the dc terminals of the dc energy store, and (iii) any losses in the dc energy store circuit.

\* \* \* \* \*